INVENTOR.
WOODROW W. SMITH
BY
J. D. Copeland Jr.
AGENT

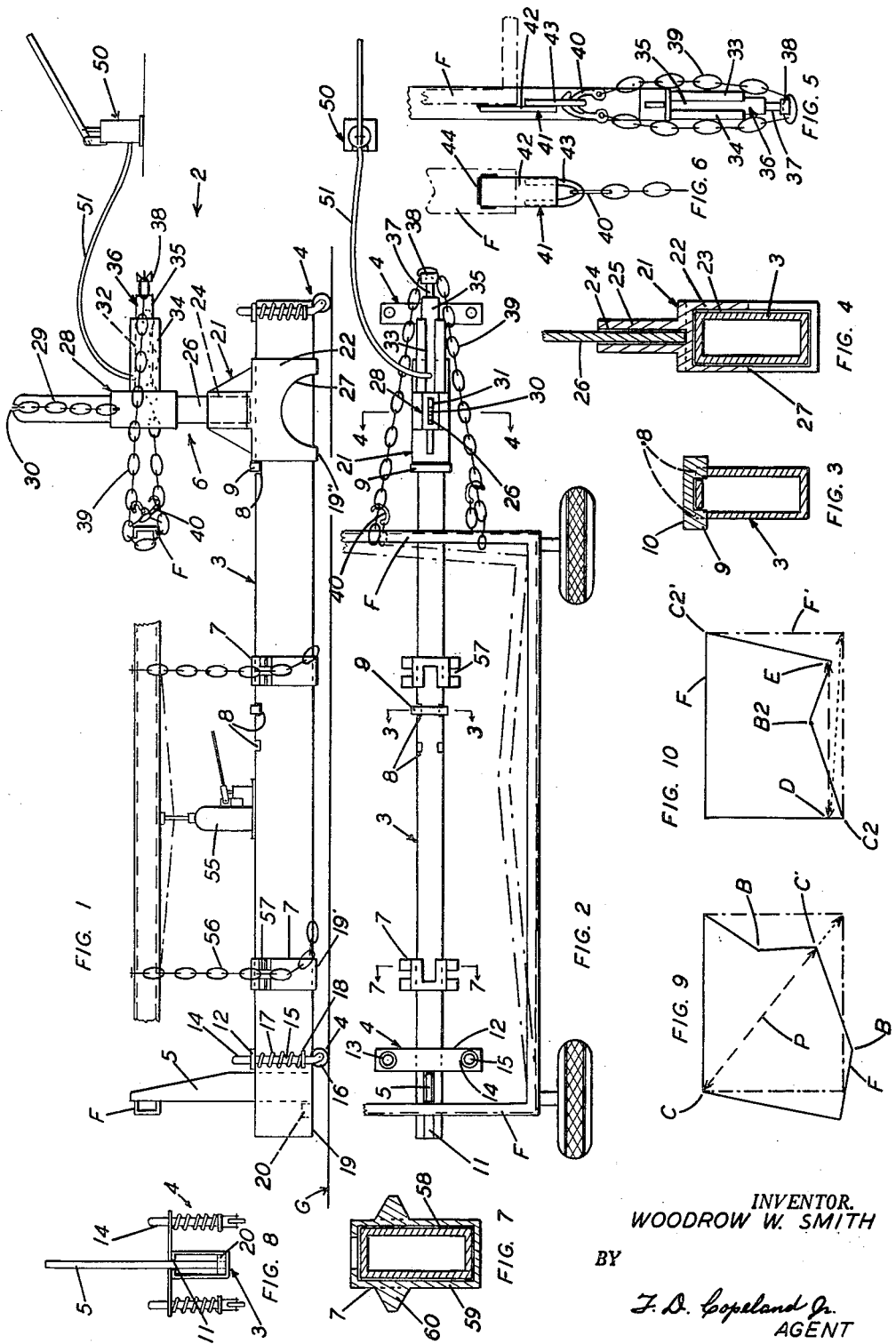
INVENTOR.
WOODROW W. SMITH
BY
F. D. Copeland Jr.
AGENT

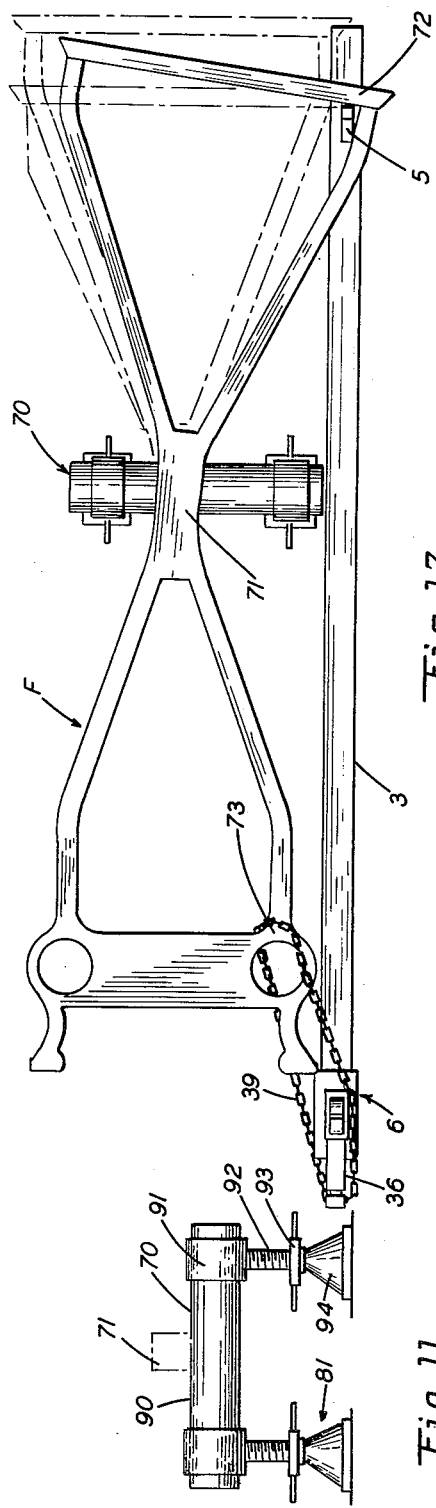
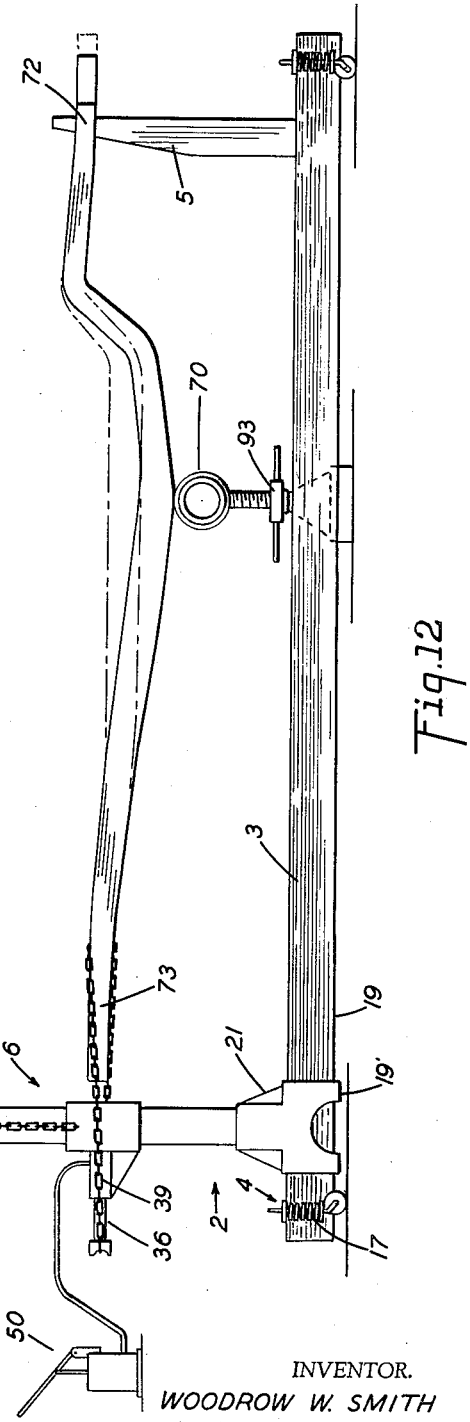

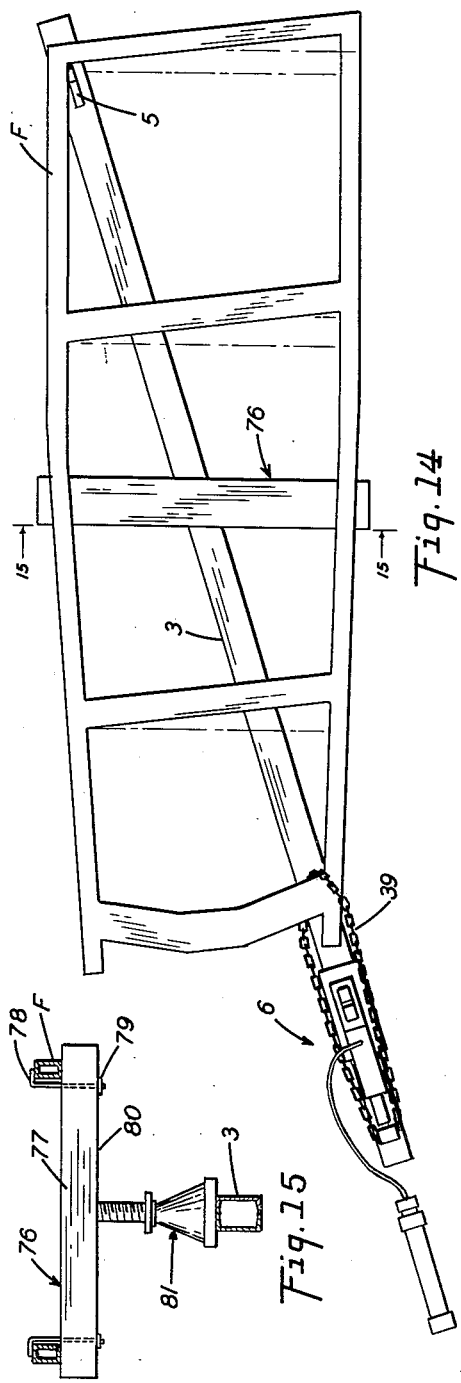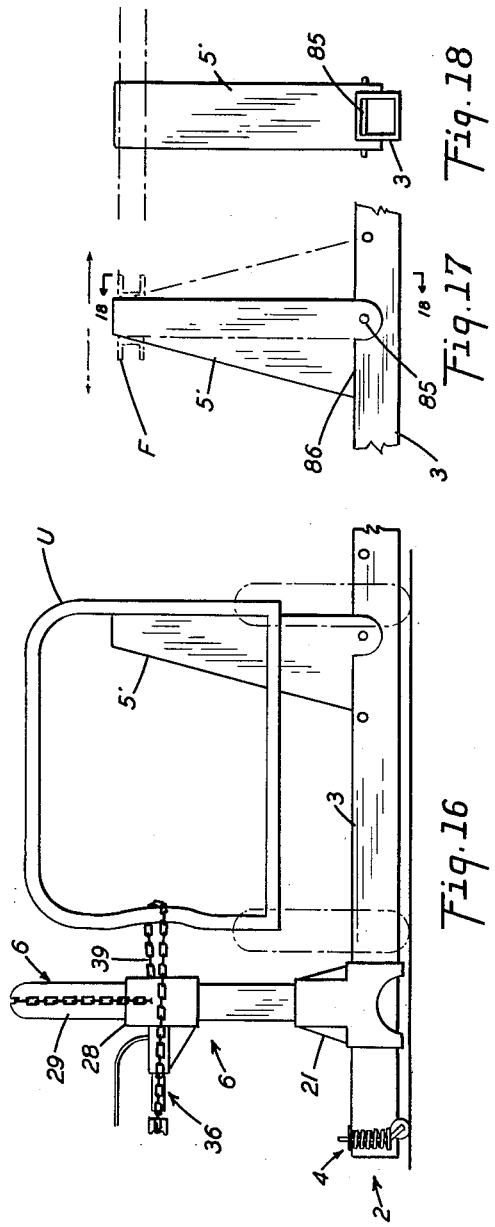

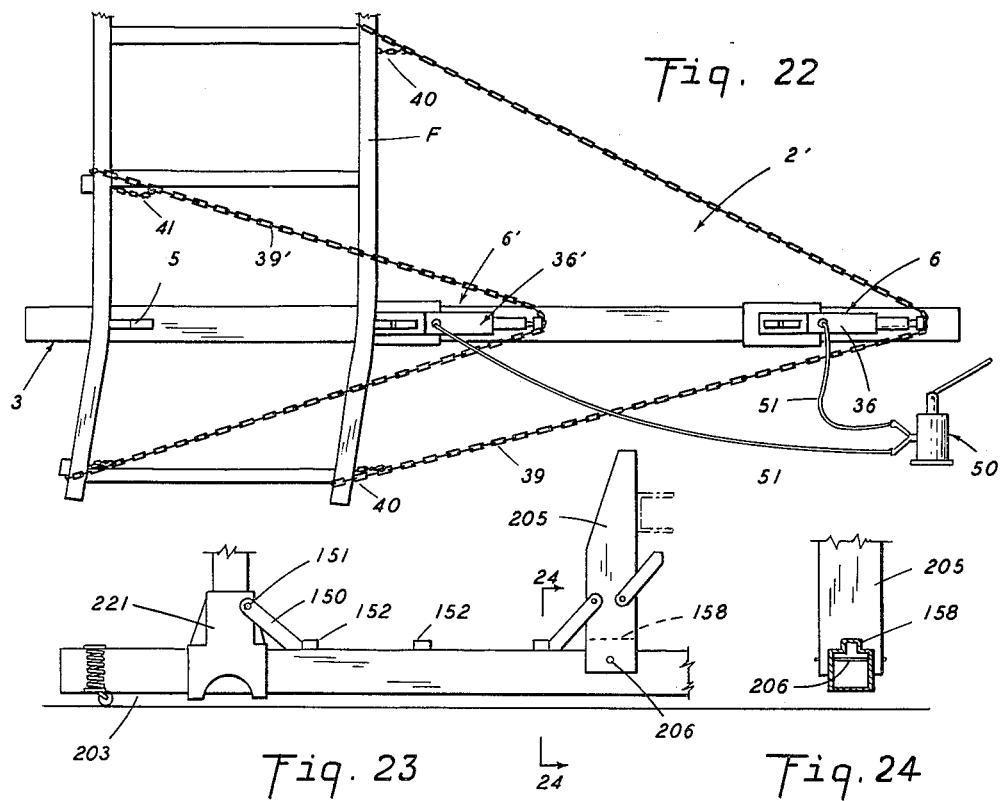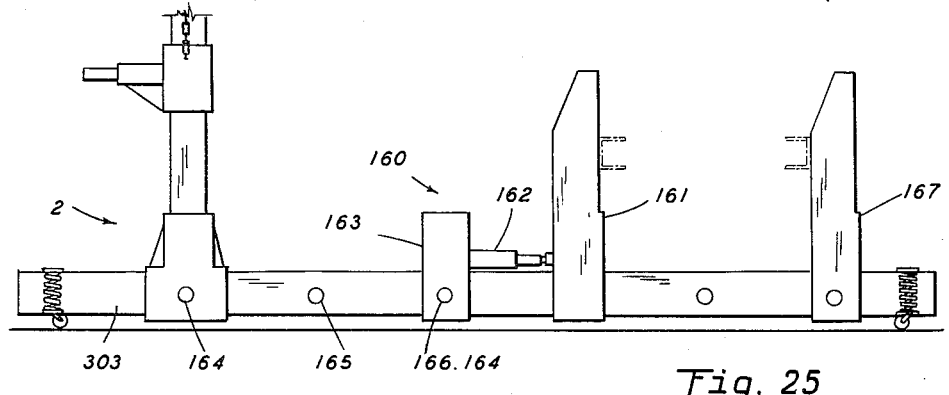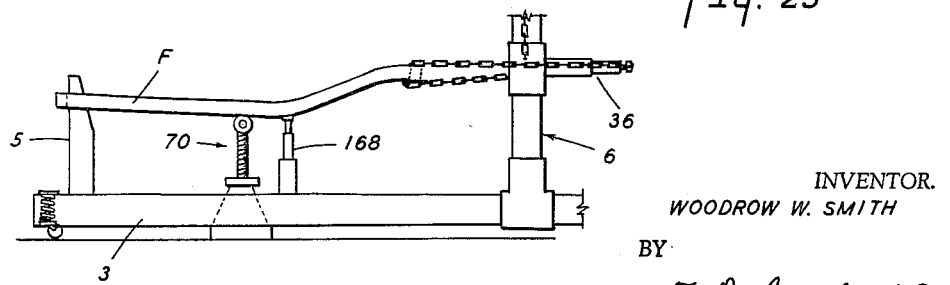

United States Patent Office 3,050,099
Patented Aug. 21, 1962

3,050,099
METHOD AND APPARATUS FOR STRAIGHTENING AUTOMOBILE FRAMES
Woodrow W. Smith, 3218 Purcell St., Grand Prairie, Tex.
Filed Dec. 30, 1957, Ser. No. 705,924
4 Claims. (Cl. 153—32)

This invention relates generally to methods and apparatus for straightening damaged automobile frames and more specifically to a method of straightening automobile frames which is suitable for use in small garages and which is within the economy of the small proprietor.

A primary object of this invention is to provide a method of straightening automobile frames which can be accomplished by one operator in a much shorter period of time than presently possible by conventional methods.

Another object of this invention is to provide an apparatus which will enable a single operator to accomplish formerly difficult frame straightening operations using portable equipment and hand tools exclusively.

And another object is to provide a method of straightening diamond, side sway, sagged, buckled, and/or twisted frames which will enable the operator to apply the straightening force to the auto where it sits without having to dismantle or perform any preparation operation to allow the automobile to be moved to and placed on conventional heavy duty frame straightening machines.

An additional object is to provide an improved frame straightening machine which may be readily moved about a shop by one man to the spot where an auto is parked, and may be readily transported to remote locations where at the above mentioned difficult frame straightening operations may be performed right at the spot where the accident occurred.

A still further object is to provide a method of straightening auto frames which includes a step by which the operator knows automatically when to apply heat in order to best utilize the method of this invention to accomplish the desired straightening results.

Another object of this invention is to provide an improved portable automobile frame straightening machine which will be capable of applying an extremely large force to a distorted frame without damage to the machine.

Another object is to provide an unique stop arrangement to provide a back up piece for the force applicator unit and in which said stop arrangement may be inserted or removed without the use of any hand tools.

And a further object is to provide a force applicator unit which is doubly reinforced at ordinarily weak points to avoid failure due to overload stress.

An additional object is to provide a compact, easy-to-handle frame machine which is capable of applying a straightening force to the main frame of an automobile while the automobile is parked directly on the ground (rather than in a frame machine) and applying this force from any direction within a full 360 degrees of horizontal rotation.

And another object is to provide a frame machine which comprises a single longitudinal beam and a longitudinally adjustable tension applying unit wherewith a tension force may be applied to frame in the proper direction to return the frame to its original shape; in many cases this will be the same direction that the distortion producing compression force was applied to the frame so that upon application of the tension force in the direction of the beam and upon the proper application of heat to the affected part, the frame will automatically revert to its original undistorted shape.

And still another object is to provide a saddle unit which is adapted to slide longitudinally along the main beam of the machine of this invention so that the force applicator unit which includes the saddle may be positioned selectively along the beam's length.

And yet another object is to provide a frame straightening apparatus which is resiliently supported above the floor and in which the force is so transmitted therethrough that when all the slack has been taken out of the apparatus and the actual straightening force has begun to be applied, the resiliency of the supports will be overcome and the apparatus will rigidly engage the floor.

And another object is to provide a method of frame straightening and to provide an apparatus for carrying out this method in which certain damages to automobile frames may be corrected by applying a straight line tensile force in a generally horizontal direction between two points only on the damaged frame; which certain damages have heretofore required either more than two points to be employed or one or more holding points to be used in order to accomplish the same result.

The field of straightening damaged automotive frames has been quite an exact and extensive art in which numerous patents have been granted and in which several manufacturers are supplying machines to permit operators to practice this art on a commercial basis. Probably the best known machines are the popular heavy duty large scale models which many frame shops purchase and permanently install on their premises. The overall operation of straightening damaged frames with these machines once they are permanently and rigidly installed in the shop is basically to first send a wrecker out to pick up the damaged auto at the spot where the accident occurred, to tow the damaged auto back to the frame shop and then to set it on the frame machine, or if the frame machine contains another auto, to set it down elsewhere in the shop or in the yard adjacent to the shop. However, since these large standard frame machines are initially expensive, there are many garages in small communities, and small garages in all communities, that do not possess a standard frame machine so that it is sometimes necessary to tow a damaged auto through several small towns before a shop having a frame machine is located, whereas, a small economical portable frame machine might be purchased and used in a small shop or even in the yard adjacent the shop to permit the damaged auto to be carried to the nearest garage for its frame straightening operation. It is therefore among the objects of this invention to provide a rugged and durable and yet extremely economical frame straightening machine which can be employed in the unique method of this invention to accomplish difficult frame straightening operations in a very short time and with less initial equipment investment than is possible by conventional methods or apparatus.

This application is a continuation in part of my copending application, Serial No. 644,614, filed March 7, 1957, entitled, Frame Straightening Machine, and the disclosure of the copending application is incorporated herein by reference.

These and other objects will be apparent from an examination of the following specifications and drawing in which:

FIG. 1 represents a side elevational view of the frame straightening machine of this invention.

FIG. 2 is a top plan view of the device of FIG. 1 showing its use in connection with a bent automobile frame.

FIG. 3 is a cross-sectional view taken along the lines 3—3 of FIG. 2.

FIG. 4 is a cross-sectional view taken along the lines 4—4 of FIG. 2.

FIG. 5 is a fragmentary detail plan view of the force applicator unit in one mode of operation.

FIG. 6 is a fragmentary elevational view of the attachment eye-piece shown in FIG. 5.

FIG. 7 is a cross-sectional view taken along the lines 7—7 of FIG. 2.

FIG. 8 is an end elevational view of the device shown in FIG. 1.

FIG. 9 is a diagrammatic plan view of a distorted automotive frame showing the direction of straightening force which is applied by the machine of this invention to restore the frame to its original shape.

FIG. 10 is a diagrammatic plan view similar to FIG. 9 but showing a different direction of force as will be required on frames having a different type of distortion.

FIGURE 11 is a front elevational view of the rigid support used to support the damaged frame members in certain aspects of this invention.

FIG. 12 is a side elevational view in diagrammatic form to show one use of the support of FIG. 11 when used with the frame of FIG. 13.

FIGURE 13 is a plan view of one modern automobile frame which has been damaged and has a distortion known in the trade as a "center sway type."

FIGURE 14 is a plan view of a frame somewhat different from FIG. 13 which has been damaged in a "diamond manner."

FIGURE 15 is a front elevational view of an adapter used on certain straightening operations when the auto frame does not have a structure in its center.

FIGURE 16 is a side elevational view partly in diagrammatic outline showing the use of this frame machine on certain normally considered "body" operations.

FIGURE 17 is a side elevational detail view of a modified dead-end post for use when this frame machine is applying either a push or pull force to the body or the frame of an automobile.

FIGURE 18 is a sectional view taken along the lines 18—18 of FIGURE 17.

FIGURE 22 is a top plan view of a modified arrangement of the apparatus of this invention and showing a modified method of using this apparatus.

FIGURE 23 is a side elevational view of a modified holding means for the force applicators used on this device.

FIGURE 24 is a cross sectional view taken along the lines 24—24 of FIG. 23.

FIGURE 25 is a side elevational view of another embodiment of the device of FIG. 22.

FIGURE 26 is a side elevational view showing another type of pull which may be made with this apparatus.

Figure 19:
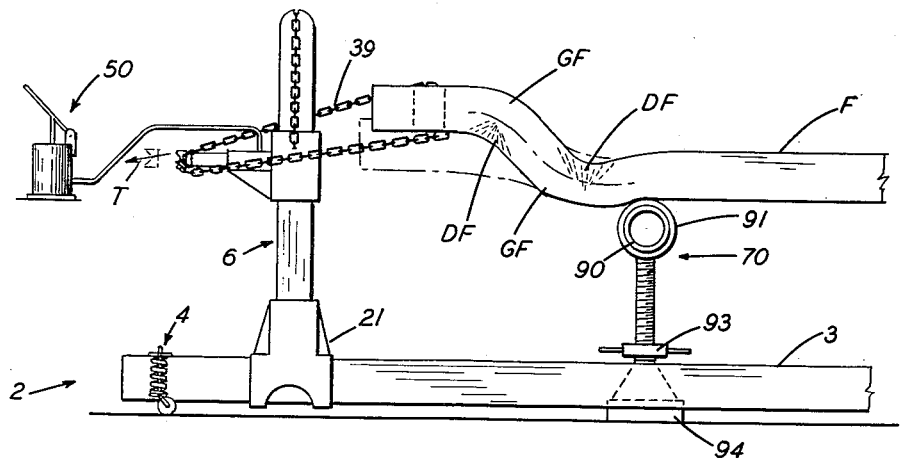
FIGURE 19 is a side elevational view in diagrammatic outline showing the method of removing a particular damage which is a combination of a side and buckled type damage.

The frame machine (2 of FIG. 1) of this invention consists basically of a single longitudinal beam 3, which is resiliently mounted on caster wheel units 4, and which includes a rigid frame engaging post 5 or "deadend" and includes at a spaced distance therefrom a force applying system comprising a force applicator post assembly 6 which supports the force applicator 36 at a selectively adjustable vertical location and a flexible force transmission means or chain 39 connected to the damaged frame.

The method of this invention consists basically, of the first step of rolling and guiding the complete light weight easy to handle machine 2 into the desired position under a parked auto and making the necessary but very simple hook-ups (one example of which is seen in FIG. 9) between two spaced points on the auto frame F, and on some occasions of placing a rigid support 70 under the principal point of damage B, and operating the power unit 50 to supply pressurized fluid to the force applicator or hydraulic jack 35 until such time that the force on the flexible fastening means or chain 39 has reached an intensity sufficient to remove all of the slack from the chain; just at the time that the force delivered by jack 35 begins to apply a direct tensile load on the frame F, a downward or torque component of this force will depress the longitudinal beam and consequently the resilient springs 17 and cause the bottom 19 (or 19') or the beam 3 to engage the ground or floor G; at this point the operator knows that any additional pressure he may supply by the hand power unit 50 to the jack 35 will result in the application of or an increase in the tensile force on frame F, and therefore this is the proper time to apply heat to the damaged point B on the distorted side or the side with the greatest distortion only. The purpose for this procedure is to apply sufficient heat to cause a reduction in the molecular attraction between the metal molecules in the direction of the damage but to apply no heat to the undistorted area. By heating in this manner, the molecular attraction is different even in a single area so that upon application of a force in the proper direction to cause the damaged metal to stretch back into place, the metal molecules on the distorted side will return to their proper position and the metal molecules on the other side will hold their correct position and will serve as a pattern to prevent any excessive movement after the correct position has been attained. This same procedure is of course effective for damage in a vertical direction, such as buckling or sag by applying heat to the top or bottom sides only; the next step is then to operate the hand unit 50 a stroke or two at a time to gradually increase the force until movement of frame F back to its original shape has begun and then to maintain this force while the actual movement of the frame is taking place. The support 75 is thus seen as functioning to guide the frame F and prevent its sagging under the momentary weakening due to the application of heat, and its function does not correspond to a rigid holding point on the frame F. After the operation has been performed in the manner described, it is often possible to unhook the portable frame machine 2, and roll it out from under the auto and then drive the automobile out of the shop. This method of employing one portion of a single beam as a non-ductile pattern while another damaged section of the same beam is straightened by the application of heat and a tensile force in the precise direction to permit the damaged area to follow the pattern as established by the undamaged area is possible due to the molecular arrangement of the material and even in part to the atomic construction of metal molecules. As one example, the carbon atom which is tetrahedral in shape is found in steel and most metals employed in automotive frames. These atoms have a positive nucleus at the center which is relatively close to the negative electrons on the tetrahedral orbital, so that there is an electrical attraction which thus forms a part of the total force which holds the matter together and is generally termed cohesion. When heat is applied to one localized area of a metal frame section the heat will be converted into kinetic energy within the metal to cause the motion of the atoms therein to increase and thus move the electrons of successive atoms to a greater distance from the positive nucleus which attracts them and this electrical bonding as well as the total cohesive force will be decreased in strength at the area affected, but will still remain strong at the unheated area, and the area in between will be progressively affected depending on its distance from the heated area. When a tensile force is applied to this area in the proper direction, the weaker heated area can then reassume its original shape by following the pattern of the unheated area. With the apparatus of this invention, a tensile force can be applied from any direction in a horizontal plane and from a great range of direction in a vertical plane and at the same time, and equally important this direction can be changed simultaneously with the application of this force and in many cases automatically without the knowledge or control of the operator.

Many steels used in automotive frame construction actually show an increase in tensile strength upon the application of heat up to approximately 750° F. but thereafter lose their tensile strength and become more ductile and workable. Thus it will be seen that when heat is applied to the damaged area on one side of an auto frame only, that side may be heated by radiation or direct flame up to 1500° F. or greater and the other side may be heated by conduction to approximately 750° F. so that the effect will be that the damaged side may be easily stretched back into its original shape whereas the undamaged side will have a greater tensile resistance than it had originally so that it will not stretch under the normally required straightening force and will thus serve as an effective guide or pattern to facilitate proper correction of the damage.

It will be observed that the basic method of this invention, may be improved upon by utilizing certain additional features once these features are pointed out. It has already been pointed out that a downward force component will cause the beam 3 to move into rigid contact with the floor or ground to provide both an improved working machine and an important safety feature. It will now be recognized that the application of the proper amount of heat at the proper location and at the proper time will cause the distorted frame member to return to its former position of its own accord without the use of any hold-backs or tie down points, provided the proper tensile force is applied in the proper direction simultaneously with the application of the heat. This method is particularly advantageous in correcting a diamond distortion to an automobile frame, and the method is particularly convenient for this type of damage which often places the automobile frame in such a distorted condition that it cannot be placed on a permanently installed frame machine, whereas the instant invention has immediate access to any part of a damaged frame up to 360 degrees of horizontal movement without ever moving the automobile.

The use of the vertical post 26 and the vertically adjustable force applicator support 28 will permit the direction of force of the force applicator 36 to be angled slightly up or down as the need may be to return the damaged frame F to its normal position, and in most applications, there will be a resulting component to force beam 3 against the floor. In other instances it may be desirable for the front end of the frame machine 2 to be automatically raised off the floor when a straightening force is applied to a frame, because it is often advantageous to have the weight of the frame machine acting on the auto frame simultaneously with the straightening force to pull out a buckled or similar type distortion.

Referring now more particularly to the characters of reference on the drawing, it will be observed that the portable frame straightening machine of this invention indicated generally at 2, consists basically of a single longitudinal member 3, shown here as a box beam which is supported at each end by anti-friction means comprising anchor post 5, a longitudinally sliding force unit 6, and longitudinally sliding chain clamps 7.

The longitudinal member 3 is longer in total length than the automobile frame on which it is to be used so that the machine 2 may straighten frames in the longest direction as shown in FIG. 9. The member 3 includes a series of corner notches 8 in the upper corners of its cross section (FIG. 3) which are dimensioned to receive the depending ears 9 of a U-shaped stop 10 to lock the stop and any adjacent equipment at a desired location along the length of the beam. At its rear top surface, member 3 includes a longitudinally extending slot 11 which opens to the end of member 3 for a purpose hereinafter described. Near each end of member 3 a transverse plate 12 is welded in a transverse direction of and extending laterally beyond the member 3 to provide a support base for the caster assembly 4. Plate 12 includes a vertical hole 13 near each end, and a short length sleeve 14 is rigidly attached to the plate at a concentric position relative to the hole and thus provide a bearing for caster rod 15. This construction will permit a relatively thin material plate 12 to be used since the plate itself will not have to provide bearing support for the vertical rod 15 to which caster unit 16 is attached. A spring 17 surrounds the rod 15 and abuts against the underside of plate 12 at its top end and against the top flat plate 18 of caster unit 16. By this arrangement, the casters 16 normally engage the ground in rolling contact at a point below the bottom edge of member 3, but when an extra downward load is added to member 3 such as the downward component of any frame straightening force being applied by unit 6, the plate 12 compresses spring 17 and member 3 travels downward until its base 19 or bases 19' of clamps 7 or unit 6 firmly engage the ground. This action immediately transforms machine 2 from a mobile into a stationary machine as far as its ability to do work is concerned.

The rear vertical post 5 is adapted to engage a stationary frame member F and thereby give the machine 2 a dead-end anchor against which the force unit 6 may push. Post 5 may be readily removed or inserted while member 3 is under a vehicle by simply tilting it forward toward the open end of its retaining slot 11 and sliding it out in a generally longitudinal direction. When the upper end of post 5 is engaging member F the lower end is engaging a crosspiece 20 which extends across the inside dimension of member 3 to act as a brace or stop for the lower end of the post 5.

The force unit 6 includes a saddle unit 21 having a horizontal housing 22 with a rectangular cavity 23 open at both ends to slidably engage the member 3 in surrounding relation therewith to permit rapid adjustment of force unit 6 lengthwise on member 3. Saddle unit 21 also includes a rectangular cavity 24 within a vertical housing 25 and extending to and opening at the top of housing 25 to receive the lower end of vertical cantilever type post 26. Housing 22 of saddle unit 21 includes a large semi-circular cut-out 27 which opens to the bottom side and leaves a pair of spaced bottom bases 19'' at each end. A housing 28 is slideably engaged to post 26 and is suspended in the desired vertical location by a chain 29 of a sufficient length to permit one link to engage a notch 30 at the top of post 26 for any position of vertical travel of housing 28 up and down post 26. The housing 28 therefore includes a rectangular vertically extending cavity 31 which corresponds to the cross-section of post 26, and also includes a second circular and horizontally extending cavity 32 having a longitudinal slot 33 extending the full length of the horizontal member 34 of housing 28 and both cavity 32 and slot 33 are open at the outer end of member 34. Cavity 32 is of a sufficient size to receive the cylinder section 35 of a force applicator of power jack 36 and in operation the base of the cylinder 35 firmly abuts the vertical portion of housing 28 and applies a force simultaneously against both housing 28 and post 26; this force being transmitted or resisted through saddle unit 21 and member 3 to the rear vertical post 5. The piston 37 of jack 36 includes a V-head 38 which will engage a flexible force transmitting member such as a single link of the pull chain 39 when the latter in anchored to a member to be pulled such as the forward end of the frame F. The chain 39 may include one or more hooks 40 to permit it to tie into the frame F as shown in FIG. 2 or to engage a special bracket 41 which is welded onto the frame F at the desired location to apply the pulling force in the proper direction. The bracket 41 is actually made up of a flat base 42 to which is welded a U-shaped eyelet 43 which provide the opening for hooks 40 to pass through to engage eyelet 43. The base 42 is shown as rectangular plate in the embodiment of FIGS. 5 and 6 but in other embodiments it is shaped in other geometrical patterns such as trapezoidal, triangular, L-shaped and as a solid wedge-shaped piece to fit specific requirements for mounting onto various frames so that when the base 42 is welded as at 44 to frame F, the chain 39 may be engaged into eyelet 43 in the proper direction to apply a frame restoring pulling force P that is required.

FIGURES 9 and 10 show two typical examples of the method of use of this simple frame straightening machine 2. In FIG. 9, the frame F includes two bad bends which were put into the frame by a force in a diagonal or semi-diagonal direction. In order to remove the bends B, a restoring pulling force must be applied in the direction of the dotted diagonal line P and heat must be applied to both bends B and possibly to the distorted corners of the frame F. To apply the force P in the direction shown, the frame machine 2 will need to be placed under the frame F with the post 5 near the corner C and the force unit 6 engaging the opposite corner C'. The distorted frame F of FIG. 10 was probably damaged by a straight ahead force which caused corners C2 and C2' to be distorted and placed a bend B2 in the side. To restore this frame, machine 2 is placed lengthwise with the frame and post 5 will engage the frame at about point D and force unit 6 will engage the frame at point E. Upon the application of hand movement to the lever of hydraulic pump unit 50, the jack 36 is energized through line 51 and piston head 38 applies a steady force through chain 39 to the frame F at point E and heat is simultaneously applied to bend B2 and possibly to one or both of the corners C2 and C2' until the frame F is restored to its original shape shown in phantom at F'.

The presence of hand jack 55 applying an upward force on the frame of FIG. 1 at the same time chains 56 are holding down on the frame will permit the frame to be straightened in a vertical direction at the same time it is receiving its horizontal straightening as pointed out in FIGS. 9 and 10. The chains 56 engage notches 57 of chain clamps 7 to hold the frame F and the beam 3 of machine 2 in a rigid engaged relationship whenever an upward force is exerted by jack 55. The clamps 7 as may be seen in FIG. 7 include a horizontal cavity 58 within the horizontal rectangular housing 59 and this cavity engages the beam 3 in free sliding relation when there is no pressure on the chains 39. A pair of laterally extending ears 60 include the chain engaging notches 57 and transmit any chain applied force directly to beam 3. The use of a jack with two spaced hold backs is a well known practice for frame straightening and is not claimed herein as invention except as it relates to an overall novel combination method of frame straightening.

With reference to FIGURES 12 and 13, a late model automobile frame F is seen to be constructed in a general X-shape and this frame has been damaged in a manner specifically identified in the frame trade as a "center sway." In order to correct this damage the frame machine 2 is placed under adjacent longitudinal corners and in a general longitudinal direction relative to the center line of the frame F; a rigid support 70 is then placed under the bent center section 71 of the frame F and a tensile force in the direction of the machine 2 is then applied to the frame between points 72 and 73. No other hold-back or force or tie down is required at any point on the frame in order to accomplish a rapid and satisfactory frame straightening job by the method of this invention. The presence of support 70 is actually not required to support the frame except that the frame at this point will be weakened when heat is applied and would not then be able to support its own weight. By applying a steady tensile force by means of force applicator unit 36 of post assembly 6 to the chain 30 (FIGURES 12 and 13), the frame F will resist this force until usually one of two things happen; either the caster springs 17 collapse and the bottom 19 of the beam 3 (or its equivalent 19') will move into rigid contact with the floor or the front end of the beam 3 which includes post assembly 6 will be raised off the floor. In either event the operator knows the time is correct for heat to be applied to the frame. When heat is properly applied to the damaged area and then further force is put on applicator 36 by means of hand pump 50, the frame F is then free to move in either direction as required for it to return to its original position. In many cases, due to the floor friction, the beam 3 will remain in place and the entire movement will take place at the front end 73 of the frame. In some cases where the wheels remain in rolling contact with the floor and beam 3 is slightly above, the rear end of machine 2 and the frame end will move slightly as shown in phantom. However, in actual practice there will be a combination of movements in both directions as the culmination of forces dictate.

In FIG. 14 a pull known as a diamond is shown to be particularly suited to be made by this machine 2 by placing the dead end post 5 against the frame F at one inside corner and attaching the applicator 2 to the opposite corner by the flexible chain 39, so that by the proper application of heat and force in a direction longitudinal with the beam 3, the frame F may be made to return to its original shape as shown in phantom.

The special adapter 76 as shown in FIG. 15 may be used if the auto frame does not have a center support and if the frame will be weakened in that area by the use of heat. This adapter consists of a box beam 77 which extends transversely across and under the auto side frame F and is attached thereto by an L-shaped rod 78 which extends down through the beam 77 and is threaded to receive a tightening nut 79. The underside 80 of the beam 77 is then available to receive a support such as 81 shown in FIGURE 15 which may use the top side of beam 3 as its base.

In FIG. 16 the use of frame machine 2 to straighten auto cowl or similar body frames or sections U is shown to utilize a close coupled, combination of end post 5 and force post unit 6 and a rather high position of unit 28 on the post 29.

FIGURES 17 and 18 show the extremely simple method by which post 5' may be used to apply either a tensile or a compressive force on a frame member F. This is accomplished by simply removing pin 85 and rotating post 5' through 180 degrees so that its horizontal resistance base 86 points in the direction opposite the force being applied to the frame.

Figure 20:
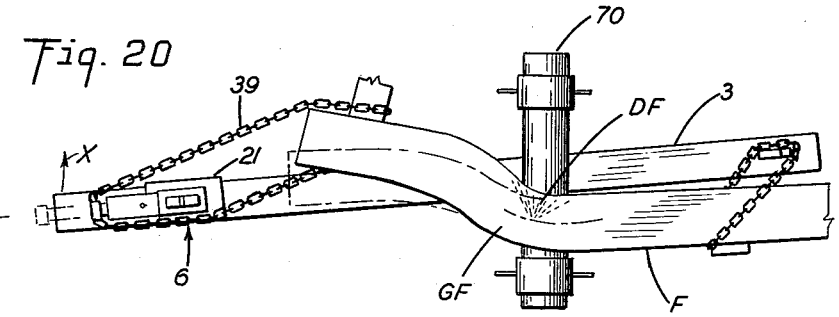
FIGURE 20 is a top plan view of a detail of a side damaged area on an auto frame, similar to that shown in FIG. 19.

In FIGURES 19 and 20 the method that heat is preferably applied to the auto frame F may be demonstrated. The position of the distorted frame and the original position of beam 3 are shown in solid outline whereas the final straightened position of frame F and the final position of applicator 36 are shown in phantom. By applying heat only to the damaged areas DF of FIGURES 19 and 20, and applying tension as shown by the arrows T, the frames may be pulled back into their original shapes without stretching. When tension is first applied the end of the beam carrying the force unit 6 swings in the direction of the arrow X, then as the damaged frame straightens, the same end of the beam swings back towards the position in which it is shown. The specific damaged area DF may be heated up to a "cherry red" temperature without heating the undamaged or guiding side GF to a point that would weaken its strength. On other occasions it may be desirable to heat up an entire section or area either all at one time or one side DF or GF at a time.

Figure 21:
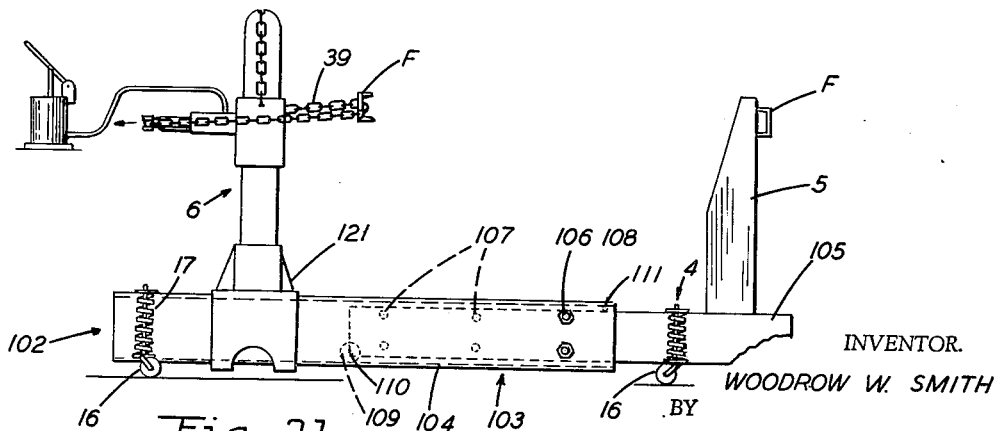
FIGURE 21 is a side elevational view showing a modified "telescoping" embodiment of this invention.

The frame machine identified at 102 in FIGURE 21 is similar to the frame machine 2 of FIG. 1 in all respects except that the beam 103 is made in two or more telescoping sections 104 and 105 which are secured together at the desired length by bolts 106 which engage selected holes 107 when these holes come into alignment with the bolt holes 108 in section 104. By this arrangement the casting 121 will be permitted free movement along section 104 until very near the end whereat it will receive interference from bolts 106 when the latter are regular headed bolts, but will not receive interference when the bolts 106' are flat headed and countersunk (not shown) in the surface of section 104. The extreme end of section 105 is normally telescoped within the section 104 and includes a small wheel 109 which is journalled about a shaft 110 at the lower forward end of box section 105. This wheel 109 together with caster wheels 16 permits easy relative movement between the sections 104 and 105 for telescoping purposes even though the box beams which make up these sections are heavy duty structures. A small roller 111 is journalled near the top of beam section 104 at its open end to prevent binding during longitudinal telescoping movement of section 105 into section 104.

In FIGURE 22 the complete assembly 2' is identical to the assembly 2 of FIGURE 1 with the exception that assembly 2' include an additional force applicator post 6' and the two post assemblies 6 and 6' are cooperatively used to straighten a particular type of side or center sway damage as shown in the frame F of FIGURE 22. In this arrangement the center applicator post assembly 6' abuts the near side of frame F at the point of damage and acts thereagainst in the same manner relative to applicator post assembly 6 as the dead-end post 5 abutting the far side of the frame acts relative to its post assembly 6'. A pair of chains 39 and 39' are then attached at spaced points along the frame on either side of the damaged area by their hooks 40 and 40'. It will be apparent that the uniform application of force to both sides of the frame F by the post assembly 6' and the dead-end post 5 will result if the two applicators 36 and 36' are attached by hose 51 and 51' to the same pump unit 50.

In FIGURE 23 a simple U-shaped link 150 is pivoted at 151 to each side of the casting 221 so that the link 150 may ride in an up position past the series of stops 152 until the desired location is reached at which time link 150 is lowered in abutting relation to the stop 152 to resist any force in the one direction controlled by the stop. An interior cavity similar to 158 is cut out to permit a sliding passage of the casting 121 and of post 205 past the stops 152. The post may be pinned to the beam 203 by a pin 206 for a stationary attachment thereon (FIGURE 24).

In FIGURE 25, the primary assembly 2 of force applicator post assembly 6 and dead-end post 5 includes an additional force unit 160 which comprises a sliding post 161 which is activated by a force applicator 162 from a stationary post 163. In this embodiment all of the beam tools are pinned to the beam 303 by means of pins 164 which selectively engage the holes 165 of the beam 303 while passing thru the tool unit pin holes 166. Posts 161 and 167 both encircle the beam 303 for a free sliding contact therewith.

FIGURE 26 shows a pull being made by this machine which corresponds to that shown in FIGURE 19, with the exception that here a vertical force applicator 168 is installed exactly at the point of sag and the two applicators 168 and 36 are synchronized to apply a steady gradual force to both pull the frame longitudinally forward and lift the sag out simultaneously.

From the foregoing description it will be readily seen that there has been produced a device which substantially fulfills the objects of the invention as set forth herein. The invention is not limited to the exemplary constructions herein shown and described, but may be made in many ways within the scope of the appended claims.

What is claimed is:

1. A method for correcting a damaged auto frame comprising the steps of engaging one end of a wheel-supported longitudinal member with said frame in a selected location on said frame, causing the other end of said member to assume a first desired position, flexibly attaching the other end of said member to said frame at another location on said frame, said other end being outside the outline of said frame, applying a corrective tensile force to said frame at said other location through said other end of said member, said force being directed at an angle to the imaginary straight line connecting said two locations, applying heat to the damaged areas of said frame while continuing the application of said force, and thereby causing said tensile force to automatically change its direction by the movement of said other end, relative to said other location and to its first desired position, to a final desired position as said frame resumes its original normal shape under the influence of said heat and said continuously applied tensile force.

2. The method defined in claim 1, including the step of rigidly spacing said frame from said member at a point between said locations.

3. The method defined in claim 1, including the step of rigidly supporting said damaged frame at the damaged area.

4. In a device for straightening damaged automobile frames, in combination, a strain sustaining longitudinal beam of low elevation having a portion of its length operatively positionable in any horizontal direction under an automobile of normal height, a force applying system comprising a strain sustaining member, a force applying means and flexible force transmitting means operatively interconnected, means securing said strain sustaining member to said beam adjacent one end thereof, said strain sustaining member comprising a cantilever portion extending transversely to said beam to a higher elevation than any part of said automobile frame, means on said strain sustaining member to support said force applying means outside the outline of said automobile frame and above said beam for the application of a tension induced lateral bending force within the automobile frame by means of said flexible force transmitting means connecting said force applying system to said automobile frame at a first selected location, the point of operative connection of said flexible means to said strain sustaining member being adjustable along said cantilever portion of said strain sustaining member, force reaction means engaging said beam adjacent the end opposite said one end of said beam and consisting of a separate strain sustaining member which is readily operatively applicable to said beam after said beam is operatively positioned under an automobile frame, said reaction means engaging said frame at a second location whereby said beam is free to pivot about said second location as the direction of the applied force changes in straightening said frame, and anti-friction means operative between said beam and the floor enabling said beam to pivot about said second location as the direction of the applied force changes due to the lateral bending of said frame during the straightening operation.

References Cited in the file of this patent

UNITED STATES PATENTS

| | | |
|---|---|---|
| 1,107,833 | Parker | Aug. 18, 1914 |
| 1,676,263 | Hawkins | July 10, 1928 |
| 1,785,923 | Wade | Dec. 23, 1930 |
| 2,008,929 | Scherer | July 23, 1935 |
| 2,100,564 | Mandl | Nov. 30, 1937 |
| 2,140,686 | Bennett | Dec. 20, 1938 |
| 2,286,893 | Boisson | June 16, 1942 |
| 2,442,425 | Merrill | June 1, 1948 |
| 2,456,218 | Semisch | Dec. 14, 1948 |
| 2,512,228 | Fontaine | June 20, 1950 |
| 2,563,527 | Gingrich | Aug. 7, 1951 |
| 2,597,103 | Johnson | May 20, 1952 |
| 2,597,234 | Elam | May 20, 1952 |
| 2,742,945 | Jacobsen | Apr. 24, 1956 |
| 2,750,983 | Rogers | June 19, 1956 |